United States Patent
Rho et al.

(10) Patent No.: US 12,110,006 B2
(45) Date of Patent: Oct. 8, 2024

(54) SYSTEM AND METHOD FOR CONTROLLING LIMP-HOME REVERSE TRAVELING OF HYBRID ELECTRIC VEHICLE

(71) Applicants: Hyundai Motor Company, Seoul (KR); Kia Corporation, Seoul (KR)

(72) Inventors: Jeong Won Rho, Seoul (KR); Chil Seong Park, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 361 days.

(21) Appl. No.: 17/832,048

(22) Filed: Jun. 3, 2022

(65) Prior Publication Data
US 2023/0001913 A1 Jan. 5, 2023

(30) Foreign Application Priority Data
Jun. 30, 2021 (KR) .................. 10-2021-0085485

(51) Int. Cl.
*B60W 20/50* (2016.01)
*B60W 30/18* (2012.01)
*B60W 50/00* (2006.01)

(52) U.S. Cl.
CPC ...... *B60W 20/50* (2013.01); *B60W 30/18036* (2013.01); *B60W 2050/0012* (2013.01); *B60W 2510/0638* (2013.01); *B60W 2510/242* (2013.01); *B60W 2510/30* (2013.01)

(58) Field of Classification Search
CPC .......... B60W 20/50; B60W 30/18036; B60W 2050/0012; B60W 2510/0638; B60W 2510/242; B60W 2510/30
USPC .......................................................... 701/22
See application file for complete search history.

(56) References Cited

U.S. PATENT DOCUMENTS

| | | | |
|---|---|---|---|
| 2013/0311029 A1* | 11/2013 | Tagawa | B60W 10/06 180/65.265 |
| 2015/0321664 A1* | 11/2015 | Bae | B60L 3/0023 180/65.265 |
| 2018/0304882 A1* | 10/2018 | Koh | B60W 10/08 |
| 2020/0114902 A1* | 4/2020 | Kim | B60W 10/06 |
| 2021/0115100 A1 | 4/2021 | Pancook et al. | |

FOREIGN PATENT DOCUMENTS

KR 20200012870 A 2/2020

* cited by examiner

*Primary Examiner* — Hunter B Lonsberry
*Assistant Examiner* — Helen Li
(74) *Attorney, Agent, or Firm* — Slater Matsil, LLP

(57) ABSTRACT

A system for operating a hybrid electric vehicle includes a hybrid starter generator generating a counter-electromotive force while rotating with an engine when conditions are satisfied, including where starting of the engine is secured, a main relay is turned off, and an engine clutch is opened according to a request for reverse traveling, in a state where a component of a high-voltage system is failed, a motor reversely rotating using the counter-electromotive force of the hybrid starter generator, an electronic load component operated using the counter-electromotive force of the hybrid starter generator, and a controller determining an engine speed required by load output values according to operations of the motor and the electronic load component, and restricting the operation of the motor or the electronic load component according to a determined engine speed.

20 Claims, 4 Drawing Sheets

SYSTEM AND METHOD FOR CONTROLLING LIMP-HOME REVERSE TRAVELING OF HYBRID ELECTRIC VEHICLE

CROSS-REFERENCE TO RELATED APPLICATIONS

This application claims the benefit of Korean Patent Application No. 10-2021-0085485, filed on Jun. 30, 2021, which application is hereby incorporated herein by reference.

TECHNICAL FIELD

The present disclosure relates to a system and a method for controlling limp-home reverse traveling of a hybrid electric vehicle.

BACKGROUND

A hybrid electric vehicle (HEV) is a vehicle using at least two different types of driving sources, and generally means a vehicle capable of being driven by an engine and a motor.

As illustrated in FIG. 1, a powertrain for a hybrid electric vehicle may be configured to include an engine 10, a motor 20, an engine clutch 30 arranged between the engine 10 and the motor 20 and configured to deliver or disconnect engine power, a transmission 40 configured to shift and output the power to a traveling driving shaft 60, a hybrid starter generator (HSG) 50, which is a kind of motor connected to a crank pulley of the engine 10 to start the engine and generate the power, and a high-voltage battery 70 connected to the motor 20 and the hybrid starter generator 50 to be chargeable or dischargeable with a main relay 90 interposed therebetween.

Further, inverters 81 and 82 configured to control the driving of the motor and the hybrid starter generator are connected between the motor 20 and the main relay 90, and between the hybrid starter generator 50 and the relay 90, respectively.

The engine clutch 30 may be locked-up (coupled) or opened (separated) by a control of a hybrid control unit (HCU), which is a top-level control unit of the hybrid electric vehicle.

Generally, for the reverse traveling of the hybrid electric vehicle, a shifting gear of the transmission 40 is controlled to a reverse stage (R stage), and the reverse traveling of the vehicle may be performed by a rotation power of the engine 10 or the motor 20 in the reverse stage state.

Recently, to reduce the cost and weight of the vehicle, proposed is a method for implementing reverse traveling using the motor 20 instead of a gear of the reverse stage (R stage) of the transmission 40.

In other words, since the hybrid electric vehicle has the motor 20 capable of being reversely rotated unlike a general internal combustion vehicle, the hybrid electric vehicle may engage lower ones (first or second gear) of the forward gears in the transmission and then reversely drive the motor 20, thereby implementing a backward traveling of the vehicle.

However, there is only a method for using the power of the high-voltage battery 70 for the reverse rotation of the motor 20 during the reverse traveling of the hybrid electric vehicle. Thus, the motor 20 may not be driven by the power of the high-voltage battery 70 if the main relay 90 is turned off due to the occurrence of abnormality in a high-voltage system, such as the high-voltage battery, which makes it impossible to perform the reverse traveling of the vehicle.

Therefore, there is a need for a method for reversing the vehicle in a limp-home situation where the main relay is turned off due to failure of a component of the high-voltage system.

Here, as the related art, the method for controlling the limp-home reverse traveling of the hybrid electric vehicle having the transmission excluding the reverse stage (R stage) in the limp-home situation where the main relay is turned off due to failure of the component of the high-voltage system will be described as follows with reference to FIG. 2.

First, it is checked whether the component of the high-voltage system, such as the high-voltage battery 70, is in a failed state (S1).

Subsequently, when the component of the high-voltage system is in the failed state, it indicates a state where the power may not be supplied to the motor. Thus, the engine is started for emergency traveling by the driving of the engine, that is, the limp-home traveling (S2).

For example, if the high-voltage battery is failed (e.g., overtemperature, overvoltage, or overcurrent), the HCU, which is a high-level control unit, may transmit an instruction for starting the engine to an engine control unit when a battery control unit having recognized the failure of the high-voltage battery transmits a failure signal to the HCU, thereby starting the engine.

When the starting of the engine 10 is secured, the main relay 90 is turned off by the HCU or the battery control unit for protecting high-voltage components (S3).

At this time, if a driver requests the reverse traveling, that is, if the driver operates a shifting lever to the reverse stage, the engine clutch 30 is opened by the control of the HCU (S4).

The reason why the engine clutch 30 is opened is that a rotation direction of the engine 10 and a rotation direction of the motor 20 for the reverse traveling of the vehicle are opposite to each other.

Subsequently, a counter-electromotive force is generated while the hybrid starter generator 50 connected to the engine is rotated with the driving of the engine 10 according to the starting of the engine, and the motor 20 is reversely rotated using the counter-electromotive force (S5).

For example, when a motor control unit performs a pulse width modulation (PWM) control for a constant voltage control with respect to the counter-electromotive force generated by the hybrid starter generator 50 rotating with the engine 10, a constant voltage according to the constant voltage control may be stored in a DC-link capacitor via the inverter 80 included in the motor control unit, and the stored constant voltage may be provided to the motor 20, and therefore, the motor 20 may be reversely rotated.

Therefore, the reverse traveling of the vehicle is performed by the reverse rotation of the motor 20.

At this time, to prevent the situation where the motor may not be driven by lack of the voltage during the reverse traveling, the output of the motor 20 is easily secured by prohibiting operations of electronic load components unnecessary for the reverse traveling, such as a low voltage DC/DC converter (LDC) and an air conditioner compressor.

In other words, a constant voltage obtained by the constant voltage control with respect to the counter-electromotive force of the hybrid starter generator is consumed only for driving the motor for the reverse traveling, and is restricted from being consumed by the electronic load components unnecessary for the reverse traveling, such as the LDC and the air conditioner compressor.

Therefore, it is possible to further secure the available output of the motor by restricting the operations of the electronic load components, such as the LDC and the air conditioner compressor.

However, when output equal to or higher than the counter-electromotive force generated by the hybrid starter generator is used for the output of the motor due to an increase in a speed or a torque of the motor, that is, when a current output of the motor is larger than a reference value by comparing the current output of the motor with the reference value (output equal to or higher than the counter-electromotive force of the hybrid starter generator) (S6), the PWM control for the constant voltage control performed with respect to the counter-electromotive force of the hybrid starter generator may be released (S7), which makes it impossible to perform the limp-home reversing traveling.

Further, during the aforementioned limp-home reverse traveling, the operations of the electronic load components, such as the LDC and the air conditioner compressor, are prohibited, which may cause not only a passenger's inconvenience but also a shut-down phenomenon of the vehicle attributable to a decrease in a state of charge of a 12 V auxiliary battery charged by the LDC.

The above information disclosed in this Background section is only for enhancement of understanding of the background of the disclosure and accordingly it may include information that does not form the prior art that is already known to a person of ordinary skill in the art.

SUMMARY

The present disclosure relates to a system and a method for controlling limp-home reverse traveling of a hybrid electric vehicle. Particular embodiments relate to a system and a method for controlling limp-home reverse traveling of a hybrid electric vehicle, which may allow power consumption components, other than a motor using a counter-electromotive force of a hybrid starter generator, to be operated when a reverse traveling of a hybrid electric vehicle having a transmission excluding a reverse stage (R stage) is performed by the driving of the motor.

Therefore, embodiments of the present disclosure can solve problems associated with the related art, and an embodiment of the present disclosure provides a system and a method for controlling limp-home reverse traveling of a hybrid electric vehicle, which may prevent a PWM control for a constant voltage control with respect to a counter-electromotive force of a hybrid starter generator from being released, and at the same time, allow electronic load components, such as an LDC and an air conditioner compressor, to be operated, when limp-home reverse traveling of a hybrid electric vehicle having a transmission excluding a reverse stage (R stage) is performed by driving a motor using the counter-electromotive force of the hybrid starter generator.

An exemplary embodiment of the present disclosure provides a system for controlling limp-home reverse traveling of a hybrid electric vehicle having a transmission excluding a reverse stage, the system including a hybrid starter generator configured to generate a counter-electromotive force while rotating with an engine when conditions where the starting of the engine is secured, a main relay is turned off, and an engine clutch is opened according to a request for reverse traveling are satisfied in a state where a component of a high-voltage system is failed, a motor reversely rotated using the counter-electromotive force of the hybrid starter generator for reverse traveling, an electronic load component operated using the counter-electromotive force of the hybrid starter generator, and a control unit configured to determine an engine speed required by load output values according to the operations of the motor and the electronic load component, and to restrict the operation of the motor or the electronic load component according to the determined engine speed.

The control unit may include a load output calculation unit configured to calculate the load output value according to the operations of the motor and the electronic load component, and an engine speed control unit configured to determine the engine speed required by the load output value calculated by the load output calculation unit, and to output a signal for restricting the operation of the motor or the electronic load component when the determined engine speed is equal to or higher than a reference speed.

The load output calculation unit may be configured to calculate the load output value by summing the load output values according to the operations of the motor and the electronic load component, and then to input the calculated load output values to the engine speed control unit by a feedforward control method.

The engine speed control unit may include an engine speed map for each load output constructed for determining the engine speed required by the load output value calculated by the load output calculation unit.

Another exemplary embodiment of the present disclosure provides a method for controlling limp-home reverse traveling of a hybrid electric vehicle having a transmission excluding a reverse stage, the method including generating a counter-electromotive force by a hybrid starter generator rotating with an engine when conditions where the starting of the engine is secured, a main relay is turned off, and an engine clutch is opened according to a request for reverse traveling are satisfied in a state where a component of a high-voltage system is failed, reversely rotating the motor using the counter-electromotive force of the hybrid starter generator for the reverse traveling, operating an electronic load component using the counter-electromotive force of the hybrid starter generator, and determining an engine speed required by load output values according to the operations of the motor and the electronic load component, and restricting the operation of the motor or the electronic load component according to the determined engine speed.

The determining of the engine speed required by the load output values, and the restricting of the operation of the motor or the electronic load component according to the determined engine speed may include calculating, by a load output calculation unit, the load output value according to the operations of the motor and the electronic load component, and determining, by an engine speed control unit, the engine speed required by the calculated load output values, and restricting the operation of the motor or the electronic load component when the determined engine speed is equal to or higher than a reference speed.

When the load output value is calculated by the load output calculation unit, the load output value may be calculated by summing the load output values according to the operations of the motor and the electronic load component.

The load output value calculated by the load output calculation unit may be input to the engine speed control unit by a feedforward control method.

When determining the engine speed required by the load output value calculated by the load output calculation unit, the engine speed control unit may determine the engine speed required by the load output value on the basis of an engine speed map for each load output constructed through a test in advance.

The engine speed control unit may output, to a motor control unit, a signal for restricting the operation of the motor or the electronic load component when the engine speed exceeds the reference speed, after comparing the determined engine speed with the reference speed.

Therefore, when the operation of the motor or the electronic load component is restricted by the control of the motor control unit, a current output of the motor may be controlled to be equal to or lower than the reference speed, and at the same time, a PWM control for a constant voltage control performed with respect to the counter-electromotive force of the hybrid starter generator may not be released and continue.

On the other hand, when the engine speed determined by the engine speed control unit is equal to or lower than the reference speed, the operations of the motor and the electronic load component are maintained without restricting the operation of the motor or the electronic load component.

Through the above configuration, embodiments of the present disclosure provide the following effects.

First, when the speed of the engine connected to the hybrid starter generator is equal to or lower than the reference speed, the operation of the motor or the electronic load component may not be restricted but continue, which enables the reverse traveling of the vehicle by the reverse rotation of the motor using the counter-electromotive force of the hybrid starter generator. Further, the electronic load component, such as the air conditioner compressor, may be operated, which makes it possible to remove the passenger's inconvenience and charge the 12 V auxiliary battery by the LDC.

Second, when the speed of the engine connected to the hybrid starter generator exceeds the reference speed, the operation of the motor or the electronic load component may be restricted such that the current output of the motor may be managed to the reference value or less, which prevents the PWM control for the constant voltage control performed with respect to the counter-electromotive force of the hybrid starter generator from being released, and the motor may be continuously driven using the counter-electromotive force of the hybrid starter generator, which enables the continuous limp-home reverse traveling.

It is understood that the term "automotive", "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of embodiments of the present disclosure throughout the several figures of the drawings.

DETAILED DESCRIPTION OF ILLUSTRATIVE EMBODIMENTS

Hereinafter, preferred exemplary embodiments of the present disclosure will be described in detail with reference to the accompanying drawings.

Figure 1:
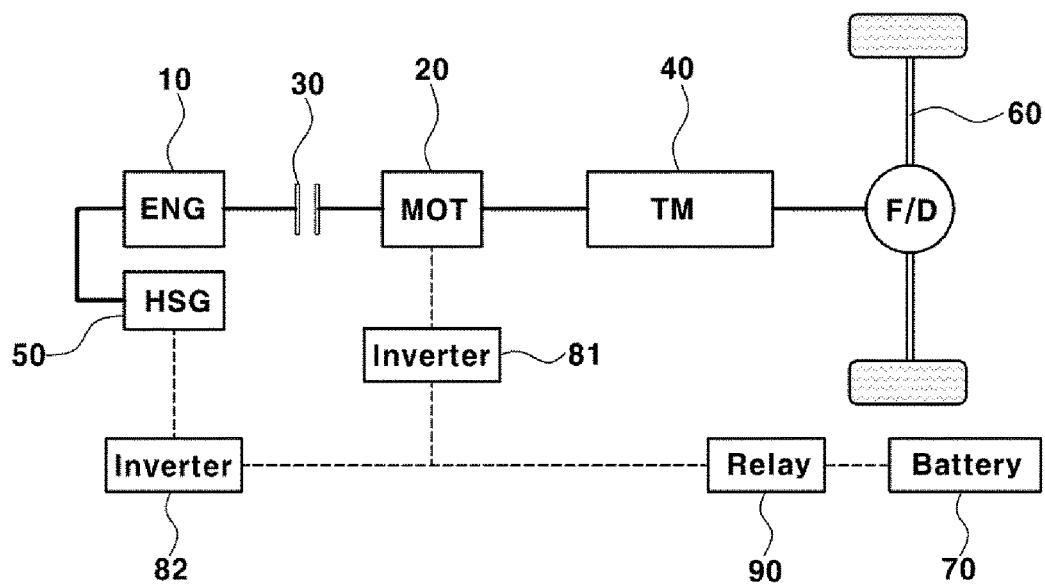
FIG. 1 is a schematic diagram illustrating a powertrain of a hybrid electric vehicle.
Figure 2:
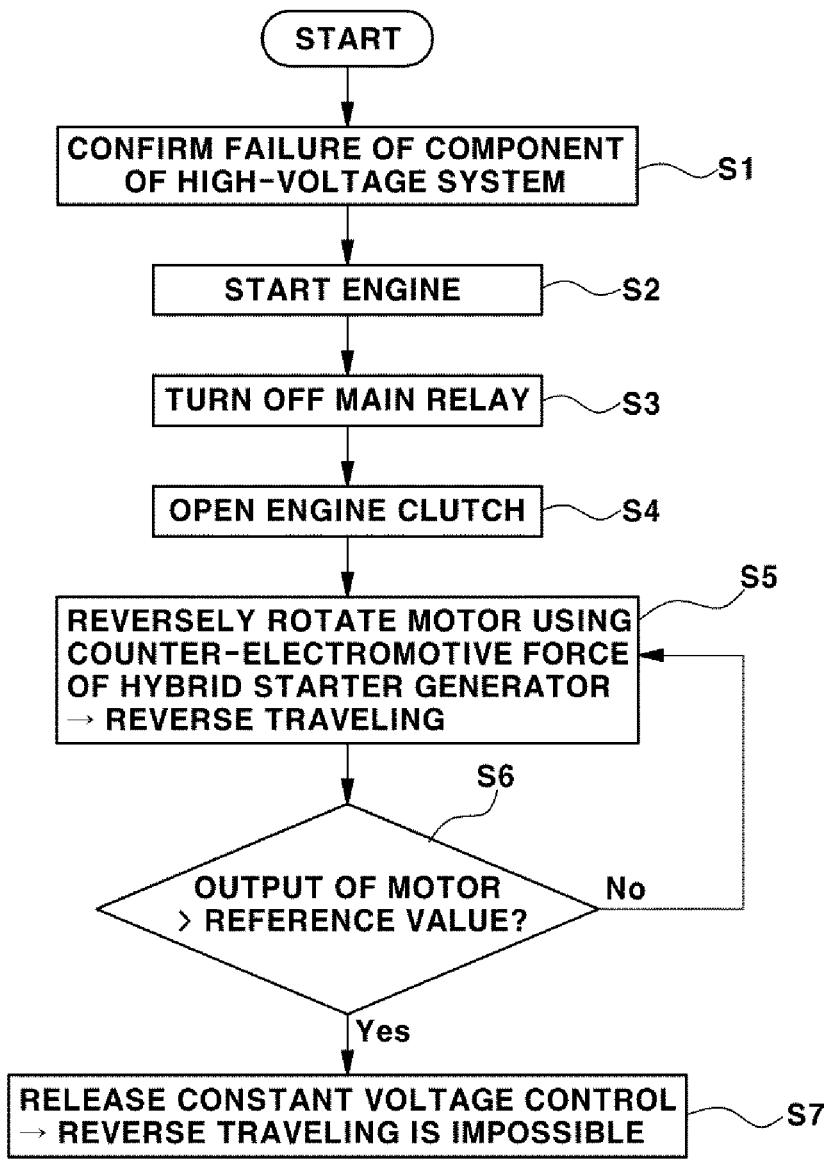
FIG. 2 is a flowchart illustrating a method for controlling limp-home reverse traveling of a hybrid electric vehicle in the related art.
Figure 3:
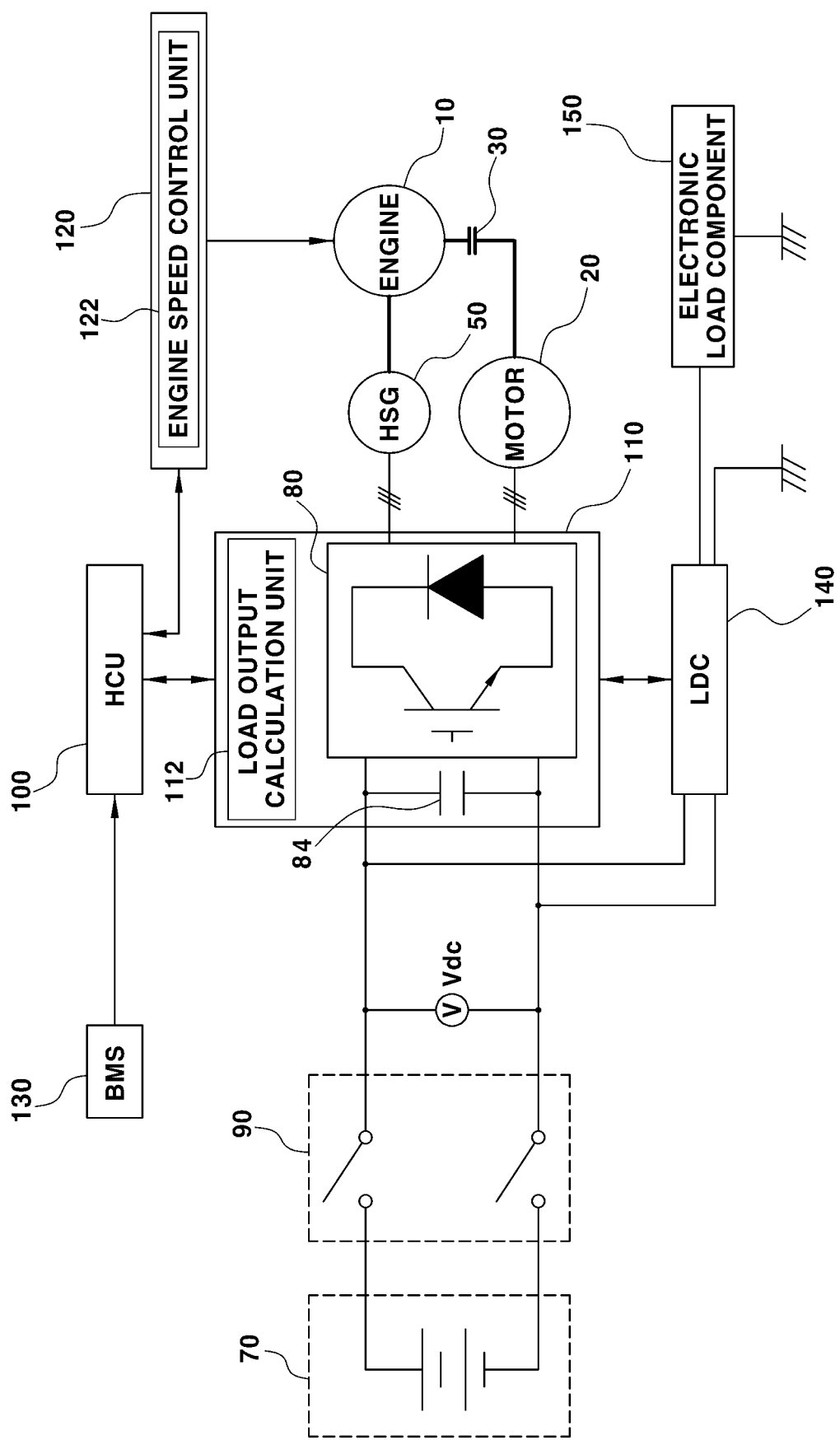
FIG. 3 is a configuration diagram illustrating a system for controlling limp-home reverse traveling of a hybrid electric vehicle according to embodiments of the present disclosure.
Figure 4:
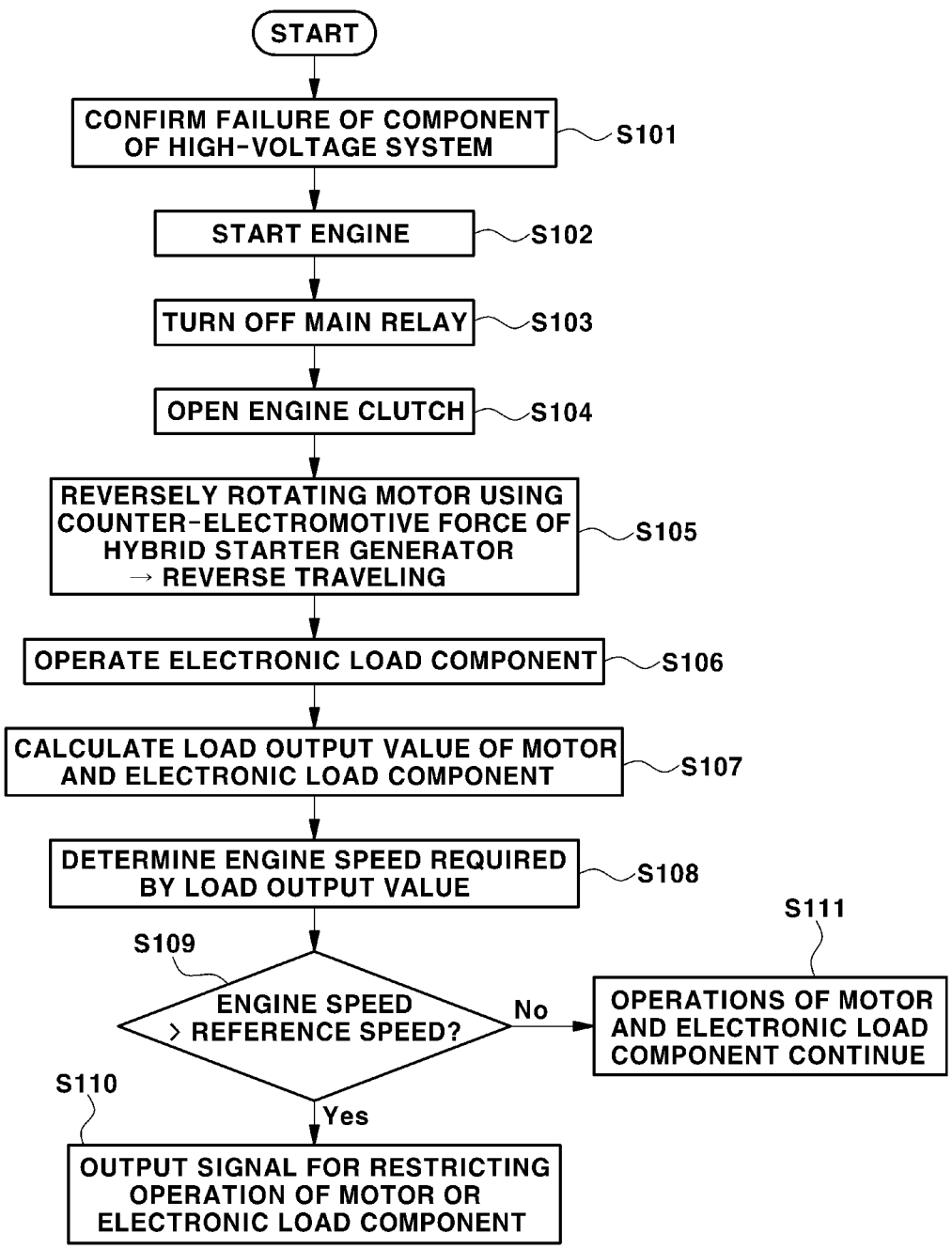
FIG. 4 is a flowchart illustrating a method for controlling the limp-home reverse traveling of the hybrid electric vehicle according to embodiments of the present disclosure.

FIG. 3 is a configuration diagram illustrating a system for controlling limp-home reverse traveling of a hybrid electric vehicle according to embodiments of the present disclosure, and FIG. 4 is a flowchart illustrating a method for controlling the limp-home reverse traveling of the hybrid electric vehicle according to embodiments of the present disclosure.

Referring to FIG. 3, a control unit configured to control a hybrid electric vehicle is configured to include an engine control unit 120 configured to control the driving of an engine 10, a motor control unit 110 including an inverter 80 configured to control the driving of a hybrid starter generator 50, which is a kind of motor, and the driving of a motor 20 for traveling, a main relay 90 installed on a DC link stage connected to the inverter 80 and a high-voltage battery 70, capable of being turned on/off, and configured to control the discharging of the high-voltage battery 70, an LDC 140 configured to convert the power of the high-voltage battery 70, and supply the converted power to the motor control unit 110 or charge a 12 V auxiliary battery (not illustrated) with the converted power, a battery control unit 130 configured to monitor a state and a state of charge of the high-voltage battery, and an HCU 100, which is the top-level control unit of the hybrid electric vehicle.

For reference, the engine control unit 120 is referred to as an engine management system (EMS), the motor control unit 110 is referred to as a motor control unit (MCU), and the battery control unit 130 is referred to as a battery management system (BMS).

A DC-link capacitor 84 is mounted on the DC link stage connected to the inverter 80 and the high-voltage battery 70.

The HCU 100 receives state information of the high-voltage battery 70 from the battery control unit 130 to determine whether the high-voltage battery 70 is failed according to predetermined diagnosis logic, and transmits an instruction for starting the engine to the engine control unit 120 when it is determined that the high-voltage battery 70 is failed due to overtemperature, overvoltage, or overcurrent.

For example, if the high-voltage battery is failed (e.g., overtemperature, overvoltage, or overcurrent), the HCU 100 may transmit the instruction for starting the engine to the engine control unit 120 when the battery control unit 130 having recognized the failure of the high-voltage battery transmits a failure signal to the HCU 100, which is a high-level control unit, thereby starting the engine.

At this time, the main relay 90 is not turned off until the engine is started, and therefore, the power of the high-voltage battery 70 may be supplied to the hybrid starter generator 50, which makes it possible to start the engine according to the driving of the hybrid starter generator 50.

When the starting of the engine 10 is secured, the main relay 90 is turned off by a control signal of the HCU or the battery control unit, and the hybrid starter generator 50 is rotated with the engine in the engine starting state, as a generator.

At this time, if a driver requests the reverse traveling, that is, if the driver operates a shifting lever to a reverse stage, the engine clutch 30 is opened by the control of the HCU 100.

Therefore, since a counter-electromotive force defined as the multiplication of a speed and a magnetic flux of the hybrid starter generator is generated while the hybrid starter generator 50 connected to the engine is rotated with the driving of the engine 10 according to the starting of the engine, the motor 20 is reversely rotated using the counter-electromotive force, which enables the reverse traveling of the vehicle.

However, as the constant voltage obtained by the constant voltage control with respect to the counter-electromotive force of the hybrid starter generator is consumed only for driving the motor for the limp-home reverse traveling, and is restricted from being consumed by electronic load components unnecessary for the reverse traveling, such as the LDC and the air conditioner compressor. Thus, when a current output of the motor exceeds a reference value (output equal to or higher than the counter-electromotive force of the hybrid starter generator), a PWM control for the constant voltage control performed with respect to the counter-electromotive force of the hybrid starter generator is released, thereby making it impossible to perform the limp-home reverse traveling, and the state of charge of the 12 V auxiliary battery charged by the LDC may be reduced, thereby resulting in a shut-down phenomenon of the vehicle.

For reference, the LDC 140 serves to convert the power between the high-voltage battery 70 and a low-voltage electronic load component 150, and to step down the high voltage of the high-voltage battery 70 to supply the step-down voltage to the 12 V auxiliary battery and the other low-voltage components in the vehicle.

To solve problems, the main focus of embodiments of the present disclosure is to prevent the PWM control for the constant voltage control with respect to the counter-electromotive force of the hybrid starter generator from being released, and at the same time, to allow the electronic load components, such as the LDC and the air conditioner compressor, to be operated, when the limp-home reverse traveling of the hybrid electric vehicle is performed by driving the motor using the counter-electromotive force of the hybrid starter generator.

To this end, the system for controlling limp-home reverse traveling of a hybrid electric vehicle having a transmission excluding a reverse stage according to embodiments of the present disclosure may include the hybrid starter generator 50 configured to generate the counter-electromotive force while rotating with the engine when conditions where the engine starting is secured, the main relay is turned off, and the engine clutch is opened according to the request for the reverse traveling are satisfied in the state where the component of the high-voltage system is failed, the motor 20 reversely rotated using the counter-electromotive force of the hybrid starter generator 50 for the reverse traveling, the electronic load component 150 operated using the counter-electromotive force of the hybrid starter generator 50, a load output calculation unit 112 configured to calculate a load output value according to the operations of the motor 20 and the electronic load component 150, and an engine speed control unit 122 configured to determine an engine speed required by the load output value calculated by the load output calculation unit 112, and to output a signal for restricting the operation of the motor or the electronic load component when the determined engine speed is equal to or higher than a reference speed.

Therefore, the engine speed control unit 122 is included in the engine control unit 120, and the load output calculation unit 112 is included in the motor control unit 110.

In other words, the engine control unit 120 could include both the engine speed control unit 122 and the load output calculation unit 112.

Alternatively, the engine speed control unit 122 and the load output calculation unit 112 may be configured as a separate integrated control unit.

In other words, the engine control unit 120 might not include both the engine speed control unit 122 and the load output calculation unit 112 or either of the units 112 and 122.

The engine speed control unit 122 is configured to determine the engine speed (engine RPM) required by the load output values according to the operations of the motor and the electronic load component, that is, the load output value calculated by the load output calculation unit 112, and to output the signal for restricting the operation of the motor or the electronic load component when the determined engine speed is equal to or higher than the reference speed.

At this time, the engine speed control unit 122 includes an engine speed map for each load output (mapping table) constructed for determining the engine speed required by the load output value calculated by the load output calculation unit 112, and the engine speed map for each load output is constructed through a test in advance.

The load output calculation unit 112 is configured to calculate the load output value according to the operations of the motor and the electronic load component when the power of the constant voltage obtained by the constant voltage control with respect to the counter-electromotive force of the hybrid starter generator is consumed by the motor and the electronic load component.

At this time, the load output value calculated by the load output calculation unit 112 of the motor control unit 110 is input to the engine speed control unit 122 of the engine control unit 120 by the feedforward control method.

Therefore, when the load output value calculated by the load output calculation unit 112 becomes feedforward and input to the engine speed control unit 122, the engine speed control unit 122 determines the engine speed on the basis of the engine speed map for each load output, prevents the operation of the motor or the electronic load component from being restricted when the determined engine speed is equal to or lower than the reference speed, which enables the reverse traveling of the vehicle while the motor 20 is reversely rotated using the counter-electromotive force of the hybrid starter generator 50 as described above.

On the other hand, the engine speed control unit 122 may output, to the motor control unit 110, the signal for restricting the operation of the motor or the electronic load component when the determined engine speed exceeds the reference speed, which makes it possible to prevent the PWM control for the constant voltage control performed with respect to the counter-electromotive force of the hybrid starter generator from being released, and to continue the limp-home reverse traveling.

In other words, when the engine speed is equal to or lower than the reference speed, the reverse traveling according to the reverse rotation of the motor may be performed in the state where the PWM control for the constant voltage control of the motor control unit with respect to the counter-electromotive force of the hybrid starter generator connected to the engine is not released. On the other hand, the required engine speed according to the increase in the load output values of the motor and the electronic load component may not be increased unconditionally. Thus, the signal for restricting the operation of the motor or the electronic load component may be output to the motor control unit 110 when the engine speed exceeds the reference speed, which makes it possible to prevent the PWM control for the constant voltage control performed with respect to the counter-electromotive force of the hybrid starter generator from being released, and therefore, the limp-home reverse traveling may continue.

Here, the method for controlling the limp-home reverse traveling of the hybrid electric vehicle according to embodiments of the present disclosure will be described in more detail step by step as follows with reference to FIGS. 3 and 4.

First, it is checked whether the component of the high-voltage system, such as the high-voltage battery 70, is in a failed state (S101).

Subsequently, when the component of the high-voltage system is in the failed state, it indicates a state where power may not be supplied to the motor. Thus, the engine is started for emergency traveling by the driving of the engine, that is, the limp-home traveling (S102).

For example, if the high-voltage battery is failed (e.g., overtemperature, overvoltage, or overcurrent), the HCU 100, which is a high-level control unit, may transmit an instruction for starting the engine to the engine control unit 120 when the battery control unit 130 having recognized the failure of the high-voltage battery transmits a failure signal to the HCU 100, thereby starting the engine.

When the starting of the engine 10 is secured, the main relay 90 is turned off by the HCU 100 or the battery control unit 130 for protecting the high-voltage components (S103).

At this time, if the driver requests the reverse traveling, that is, if the driver operates the shifting lever to the reverse stage, the engine clutch 30 is opened by the control of the HCU 100 (S104).

The reason why the engine clutch 30 is opened is that the rotation direction of the engine 10 and the rotation direction of the motor 20 for the reverse traveling of the vehicle are opposite to each other.

Subsequently, the counter-electromotive force is generated while the hybrid starter generator 50 connected to the engine is rotated with the driving of the engine 10 according to the starting of the engine, and the motor 20 is reversely rotated using the counter-electromotive force (S105).

For example, when the motor control unit performs the pulse width modulation (PWM) control for the constant voltage control with respect to the counter-electromotive force generated by the hybrid starter generator 50 rotating with the engine 10, the constant voltage according to the constant voltage control may be stored in the DC-link capacitor 84 via the inverter 80 included in the motor control unit, and the stored constant voltage may be provided to the motor 20, and therefore, the motor 20 may be reversely rotated.

Therefore, the reverse traveling of the vehicle is performed by the reverse rotation of the motor 20.

Further, the motor control unit allows the electronic load component 150, such as the LDC 140 and the air conditioner compressor, to be operated, and therefore, the constant voltage stored in the DC-link capacitor 84 may be provided to the LDC 140 and the electronic load component 150, which makes it possible to operate the LDC 140 and the electronic load component 150 (S106).

Therefore, during the aforementioned limp-home reverse traveling, the electronic load components 150, such as the LDC and the air conditioner compressor, may be operated, which makes it possible to not only remove the passenger's inconvenience but also charge the 12 V auxiliary battery by the LDC 140.

At this time, the load output calculation unit 112 of the motor control unit 110 calculates the load output values according to the operations of the motor 20 and the electronic load component 150 (S107).

In other words, the load output calculation unit 112 calculates the load output value by summing the load output values according to the operations of the motor 20 and the electronic load component 150 when the motor 20 and the electronic load component 150 consume the power of the constant voltage obtained by the constant voltage control with respect to the counter-electromotive force of the hybrid starter generator.

At this time, the load output value calculated by the load output calculation unit 112 of the motor control unit 110 is input to the engine speed control unit 122 of the engine control unit 120 by the feedforward control method.

Subsequently, the engine speed control unit 122 determines the engine speed (engine RPM) required by the load output value calculated by the load output calculation unit 112 (S108).

For example, the engine speed control unit 122 may determine the engine speed required by the load output value on the basis of the engine speed map for each load output constructed through the test in advance.

Next, the engine speed control unit 122 compares the determined engine speed with the reference speed (S109).

As the comparison result, the engine speed control unit 122 outputs the signal for restricting the operation of the motor or the electronic load component to the motor control unit 110 when the determined engine speed exceeds the reference speed (S111).

Therefore, the operation of the motor or the electronic load component may be restricted by the control of the motor control unit 110, and the restriction of the operation of the motor means that the current output of the motor is prevented from exceeding the reference value (output equal to or higher than the counter-electromotive force of the hybrid starter generator) due to the increase in the speed or torque of the motor.

Therefore, the current output of the motor may be managed to the reference value or less, and the PWM control for the constant voltage control performed with respect to the counter-electromotive force of the hybrid starter generator is prevented from being released, and therefore, the motor may be continuously driven using the counter-electromotive force of the hybrid starter generator, which makes it possible to perform the limp-home traveling without interruption.

On the other hand, when the comparison result in the step S109 indicates that the engine speed determined by the engine speed control unit 122 is equal to or lower than the reference speed, the operation of the motor 20 or the electronic load component 150 is not restricted, and therefore, the operations of the motor 20 and the electronic load component 150 may continue (S110).

Therefore, as described above, the reverse traveling of the vehicle may be performed while the motor 20 is reversely rotated using the counter-electromotive force of the hybrid starter generator 50, and further, the electronic load component 150, such as the air conditioner compressor, may be operated, which makes it possible to remove the passenger's inconvenience and also charge the 12 V auxiliary battery by the LDC 140.

While the present disclosure has been described above in detail as exemplary embodiments, the scope of the present disclosure is not limited to the aforementioned exemplary embodiments, and various changes and improvements of those skilled in the art using the basic concept of the present disclosure defined by the appended claims are also included in the scope of the present disclosure.

What is claimed is:

1. A system for operating a hybrid electric vehicle having a transmission excluding a reverse stage, the system comprising:
   a hybrid starter generator configured to generate a counter-electromotive force while rotating with an engine when conditions where starting of the engine is secured, a main relay is turned off, and an engine clutch is opened according to a request for reverse traveling are satisfied in a state where a component of a high-voltage system is failed;
   a motor configured to be reversely rotated using the counter-electromotive force of the hybrid starter generator for reverse traveling;
   an electronic load component configured to be operated using the counter-electromotive force of the hybrid starter generator; and
   a controller configured to determine an engine speed required by load output values according to operations of the motor and the electronic load component, and to restrict the operation of the motor or the electronic load component according to a determined engine speed.

2. The system of claim 1, wherein the controller comprises:
   a load output calculator configured to calculate the load output value according to the operations of the motor and the electronic load component; and
   an engine speed controller configured to determine the engine speed required by the load output value calculated by the load output calculator, and to output a signal for restricting the operation of the motor or the electronic load component when the determined engine speed is equal to or higher than a reference speed.

3. The system of claim 2, wherein the load output calculator is configured to calculate the load output value by summing the load output values according to the operations of the motor and the electronic load components, and then to input the calculated load output values to the engine speed controller by a feedforward control method.

4. The system of claim 2, wherein the engine speed controller comprises an engine speed map for each load output constructed for determining the engine speed required by the load output value calculated by the load output calculator.

5. A method for operating a hybrid electric vehicle having a transmission excluding a reverse stage, the method comprising:
   generating a counter-electromotive force by a hybrid starter generator rotating with an engine when conditions are satisfied, including where starting of the engine is secured, a main relay is turned off, and an engine clutch is opened according to a request for reverse traveling, in a state where a component of a high-voltage system is failed;
   reversely rotating a motor using the counter-electromotive force of the hybrid starter generator for reverse traveling;
   operating an electronic load component using the counter-electromotive force of the hybrid starter generator; and
   determining an engine speed required by load output values according to operations of the motor and the electronic load component, and restricting the operation of the motor or the electronic load component according to a determined engine speed.

6. The method of claim 5, wherein determining the engine speed required by the load output values, and the restricting of the operation of the motor or the electronic load component according to the determined engine speed comprises:
   calculating the load output value according to the operations of the motor and the electronic load component; and
   determining the engine speed required by the calculated load output values, and restricting the operation of the motor or the electronic load component when the determined engine speed is equal to or higher than a reference speed.

7. The method of claim 6, wherein calculating the load output value comprises calculating by summing the load output values according to the operations of the motor and the electronic load component.

8. The method of claim 6, further comprising inputting the load output value to an engine speed controller by a feedforward control method.

9. The method of claim 6, wherein determining the engine speed comprises determining the engine speed required by the load output value based on an engine speed map for each load output constructed through a test in advance.

10. The method of claim 9, further comprising:
    comparing the determined engine speed with the reference speed; and
    outputting a signal for restricting the operation of the motor or the electronic load component in response to the engine speed exceeding the reference speed.

11. The method of claim 10, wherein when the operation of the motor or the electronic load component is restricted in response to the signal, a current output of the motor is controlled to be equal to or less than a reference value, and simultaneously, a PWM control for a constant voltage control performed with respect to the counter-electromotive force of the hybrid starter generator is not released and continues.

12. The method of claim 10, wherein the operations of the motor and the electronic load component are maintained without restricting the operation of the motor or the electronic load component in response to the determined engine speed being less than or equal to the reference speed.

13. A method of operating a hybrid electric vehicle having a transmission excluding a reverse stage, the method comprising:
- confirming failure of a component of a high-voltage system;
- starting an engine;
- turning off a main relay;
- opening an engine clutch;
- reversely rotating a motor using counter-electromotive force of a hybrid starter generator for reverse traveling;
- operating an electronic load component;
- calculating a load output value of the motor and the electronic load component;
- determining an engine speed required by the calculated load output value;
- determining whether the determined engine speed is greater than a reference speed;
- in response to determining the determined engine speed is greater than the reference speed, outputting a signal for restricting operation of the motor or the electronic load component; and
- in response to determining the determined engine speed is less than or equal to the reference speed, continuing operations of the motor and the electronic load component.

14. The method of claim 13, wherein calculating the load output value comprises calculating by summing the load output values according to operations of the motor and the electronic load component.

15. The method of claim 13, further comprising inputting the load output value to an engine speed controller by a feedforward control method.

16. The method of claim 13, wherein determining the engine speed comprises determining the engine speed required by the load output value based on an engine speed map for each load output constructed through a test in advance.

17. The method of claim 13, wherein the component of the high-voltage system comprises a high-voltage battery.

18. The method of claim 13, wherein operating the electronic load component comprises providing voltage stored in a DC-link capacitor to the electronic load component.

19. The method of claim 18, wherein the electronic load component comprises a low voltage DC/DC converter or an air conditioner compressor.

20. The method of claim 18, wherein operating the electronic load component comprises charging an auxiliary battery of the electronic load component.

* * * * *